Oct. 6, 1936.    H. H. YERK    2,056,552
BREAD SLICING MACHINE
Filed March 31, 1932    5 Sheets-Sheet 1

INVENTOR
H. H. Yerk
BY
Evans & McCoy
Their ATTORNEYS

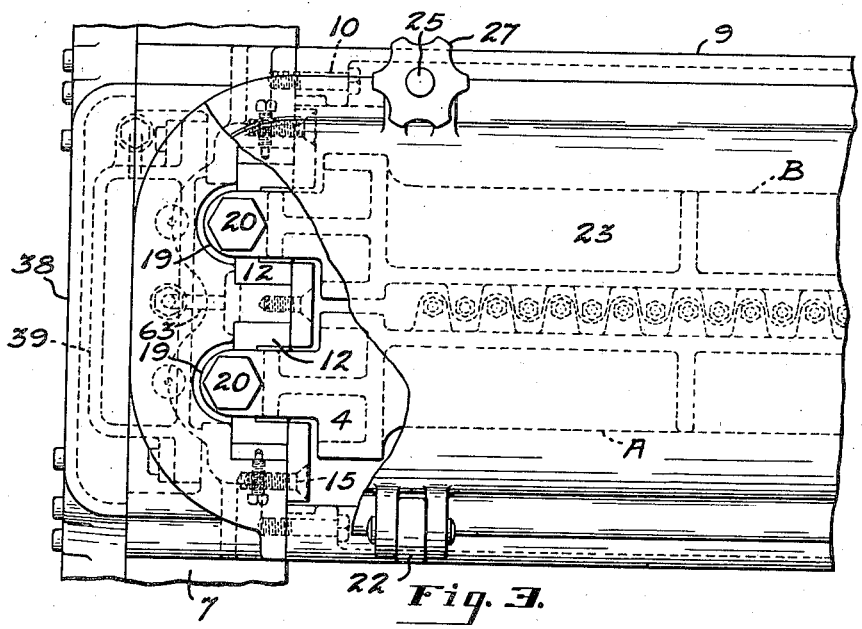
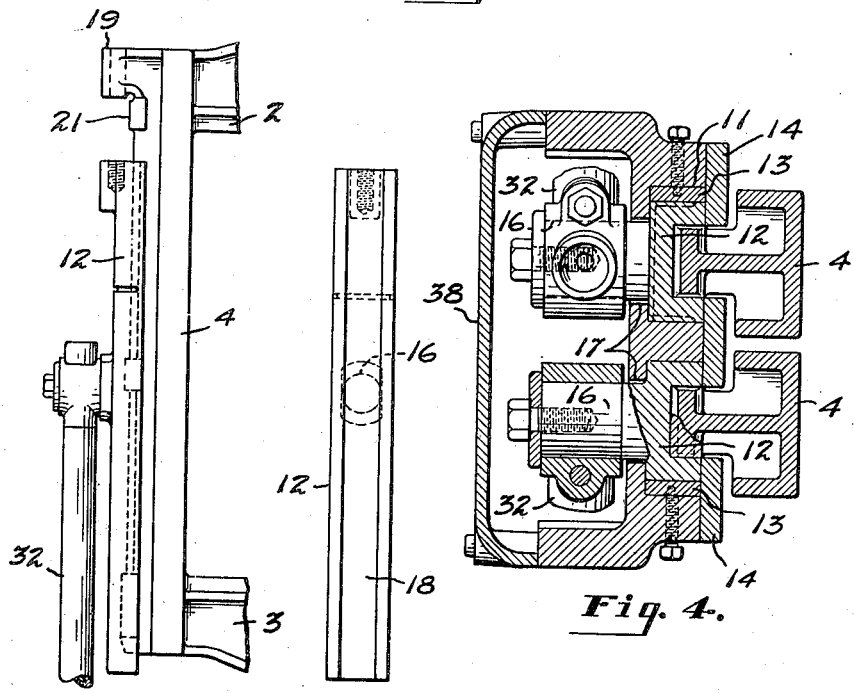

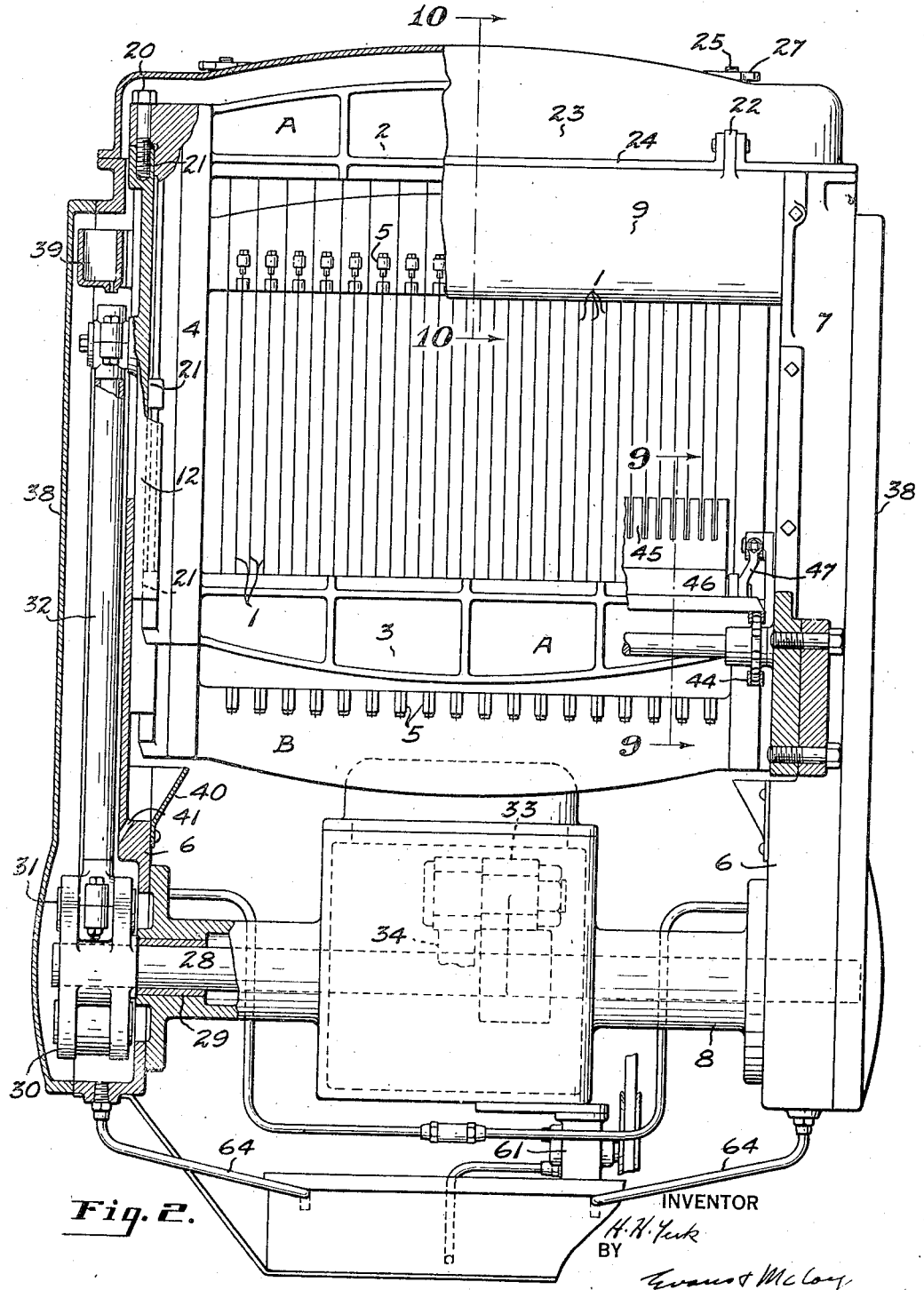

Oct. 6, 1936.  H. H. YERK  2,056,552
BREAD SLICING MACHINE
Filed March 31, 1932  5 Sheets-Sheet 4
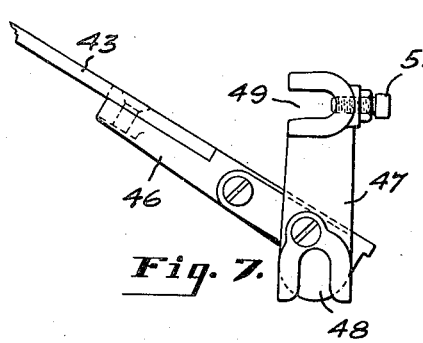
Fig. 7.
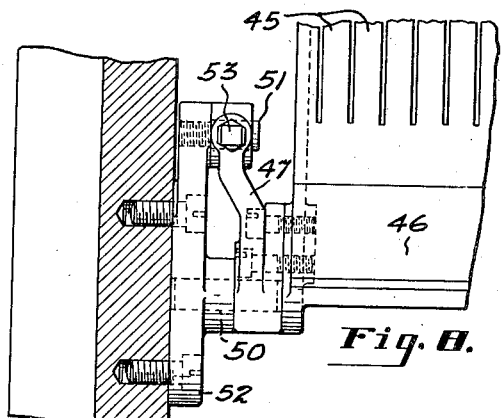
Fig. 8.
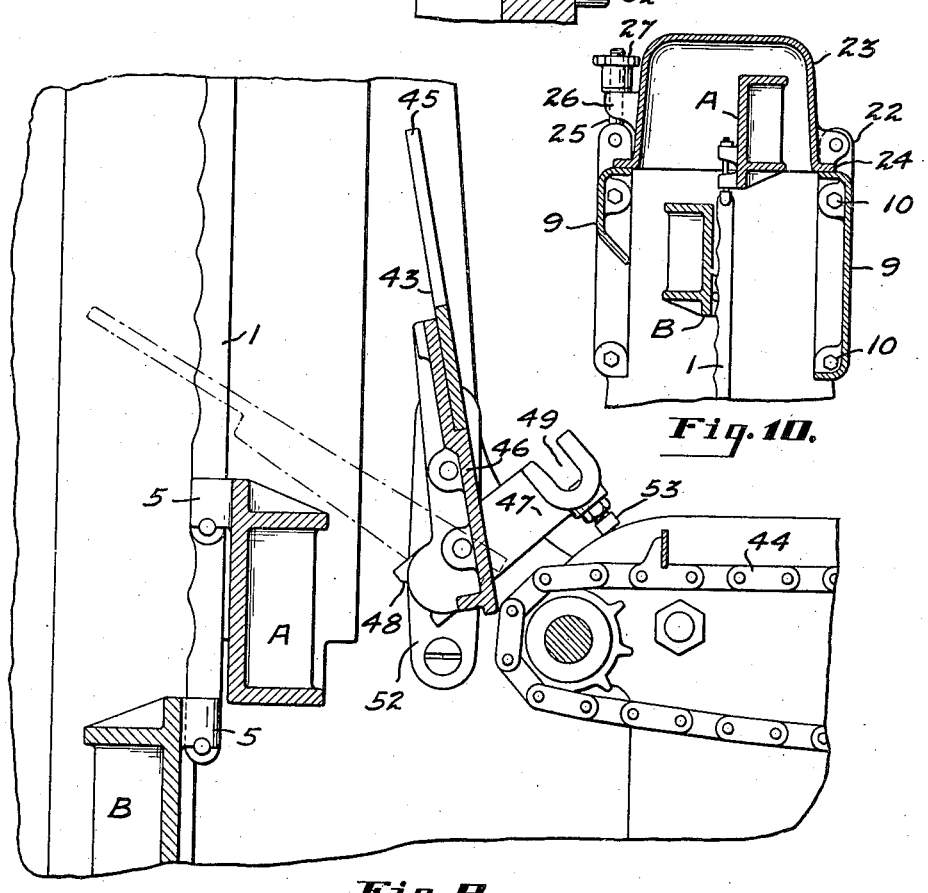
Fig. 10.
Fig. 9.
INVENTOR
H. H. Yerk
BY
Evans & McCoy
Their ATTORNEYS

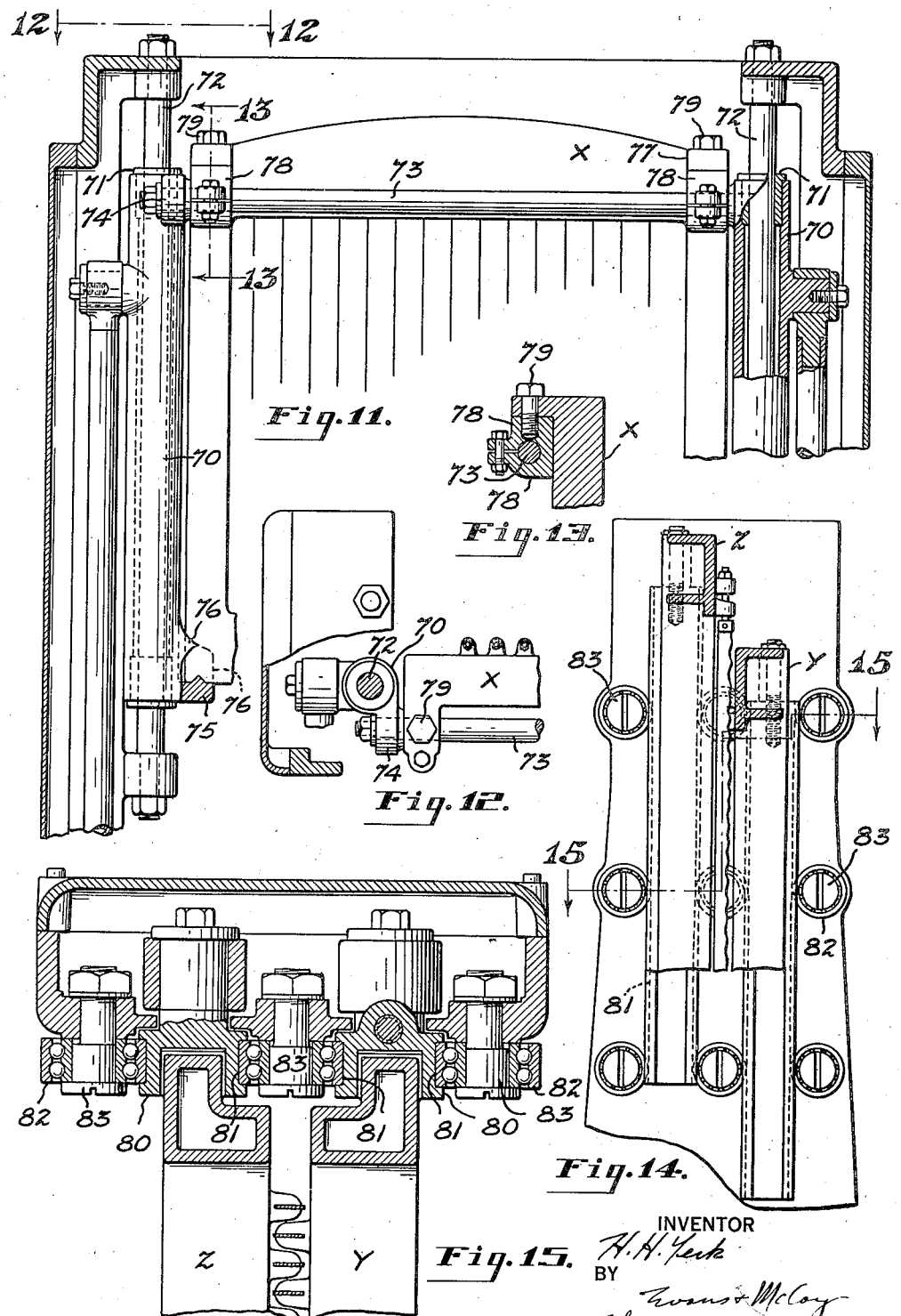

Patented Oct. 6, 1936

2,056,552

UNITED STATES PATENT OFFICE 2,056,552

BREAD SLICING MACHINE

Henry H. Yerk, Davenport, Iowa, assignor, by mesne assignments, to Micro-Westco, Inc., Bettendorf, Iowa, a corporation of Delaware Application March 31, 1932, Serial No. 602,244

3 Claims. (Cl. 146—153)

This invention relates to slicing machines, and more particularly to improvements in machines used for slicing baked bread and the like on a commercial basis.

One of the objects of the present invention is to provide a slicing machine having reciprocable slicing blades with new and improved means for supporting and actuating the blades.

Another object is to provide a slicing machine of the reciprocating blade type in which the mechanism for reciprocating the blades is completely enclosed to provide a means for lubricating the operating mechanism.

Another object is to provide a slicing machine of the reciprocating blade type in which the blade frames which carry the slicing blades are easily removable, so that the blade frames with the attached blades may be removed as a unit and replaced by blade frames having the cutting blades arranged in greater or lesser spaced relation.

Another object is to provide a slicing machine in which all the moving parts of the slicing mechanism with the exception of the cutting blades are completely enclosed.

A further object is to provide a slicing machine in which the plate which supports the article being sliced is easily removable to permit the removal of the frames which carry the slicing blades as a unit.

With the above and other objects in view which will be apparent from the following detailed description, the present invention consists in certain features of construction and combinations of parts which will be readily understood by those skilled in the art to which the invention appertains.

In the accompanying drawings, which illustrate suitable embodiments of the present invention, Figure 1 is a fragmentary side elevation of a reciprocating slicing machine, portions of the same being broken away and shown in section to illustrate the movable blade frames;

Fig. 2 is an enlarged view taken substantially as looking in the direction of the arrows 2—2 of Fig. 1, showing the blade frames and operating mechanism in front elevation;

Fig. 3 is an enlarged fragmentary plan view of the slicing machine shown in Fig. 1, portions of the same being broken away to show the blade frame guides in section;

Fig. 4 is an enlarged section taken substantially on the line 4—4 of Fig. 1;

Fig. 5 is a fragmentary view showing one of the blade frames partially assembled to its side guide;

Fig. 6 is an inner view showing the channel formed in the side guide or slide which receives the blade frame;

Fig. 7 is an end elevation of the bread transfer plate and the supporting brackets therefor;

Fig. 8 is an enlarged front elevation showing the bread transfer plate mounted on the side frames of the slicing machine;

Fig. 9 is an enlarged transverse section taken substantially on the line 9—9 of Fig. 2 showing the bread transfer plate in pivoted position to permit the withdrawal of one or both blade frames;

Fig. 10 is a transverse section taken substantially on the line 10—10 of Fig. 2;

Fig. 11 is a fragmentary front elevation of a slicing machine showing a modified means for supporting the blade frames;

Fig. 12 is a fragmentary plan view taken as looking in the direction of the arrows 12—12 of Fig. 11;

Fig. 13 is a section taken on the line 13—13 of Fig. 11; and

Figs. 14 and 15 are sectional views showing a modified means of supporting the blade frame guide slides.

Figure 1:
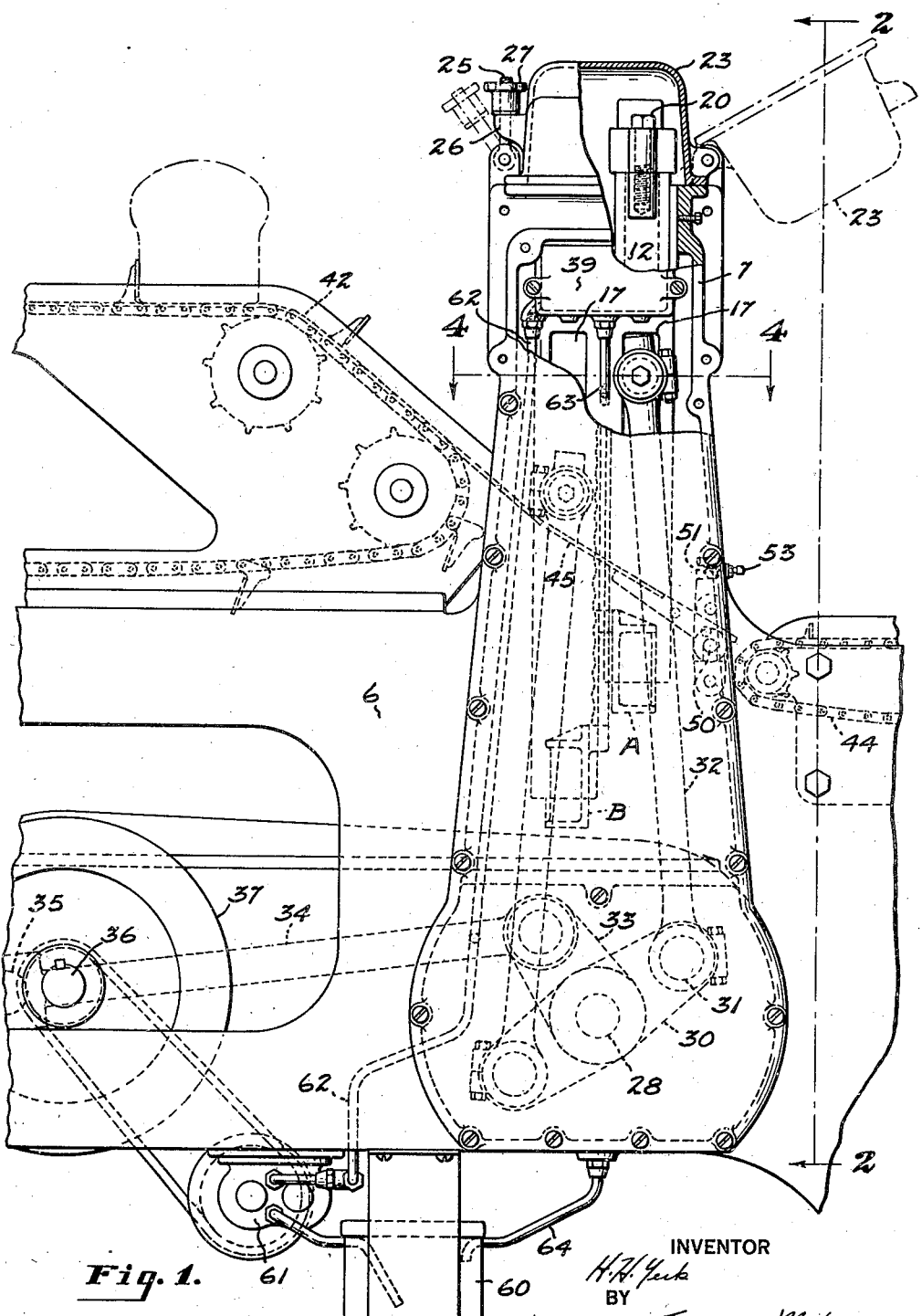

Referring to the accompanying drawings in which like numerals refer to like parts throughout the several views, the slicing machine is of the reciprocable blade type embodying blade frames A and B which alternately reciprocate in directions opposite to each other during operation of the slicing machine and each of which carries a plurality of slicing blades 1. Each blade frame comprises top and bottom head pieces 2 and 3, respectively, which are integrally joined with vertical side pieces 4. The slicing blades 1 extend between the top and bottom head pieces 2 and 3 and are mounted thereon by means of suitable regularly spaced blade-carrying lugs 5 which are so arranged with respect to the blades that the blades may be placed in tension. When mounted on the slicing machine the blades of the one blade frame are arranged midway between the blades and the other frame so that the cutting edges of all blades are in substantial alignment and so that in the assembly one blade moves in one direction while the blades adjacent each side are moving in the opposite direction.

The blade frames and actuating mechanism therefor are carried from within the slicer framework which comprises spaced side frames 6, each of which has an upstanding portion 7 intermediate its ends, the side frames being interconnected by suitable cross members 8.

The upstanding portions 7 are interconnected at their upper ends by a pair of spaced cross members 9 which are rigidly secured thereto by suitable screws 10. These cross members 9 are so arranged at the side edges of their upstanding portions that a relatively wide space is provided therebetween to permit the withdrawal of the blade frames in a manner to be later described.

Each side frame is formed on its inner face in the vertical region of the upstanding portions with a pair of adjacent parallel channels 11 which are of rectangular shape and face toward the opposite side frame. These channels extend into the upstanding portion 7 substantially to the upper edges to form vertical guideways for the slides 12 which, as will soon be described, carry the blade frames A and B.

The slides 12 which are of lesser length than the side pieces 4 of the blade frames closely fit within the channels 11, there being suitable adjustable gibs 13 interposed between the slides 12 and one wall of the channel for adjusting the bearing contact therebetween. The slides 12 are held against displacement by retaining gibs or plates 14 secured by cap screws 15 to the side frames and which overlap in bearing engagement with the inner faces of the slides 12, as shown in Fig. 4.

The two slides at each side of the framework reciprocate in their respective channels and each is provided with a trunnion or pivot portion 16 that extends through a vertical slot 17 formed in the side frame at the bottom of the channel and to which the actuating means is pivotally attached.

Each slide 12 is formed with a rectangular shaped recess 18 that extends its entire length and the recesses in the slides at one side of the machine are in direct transverse alignment with the corresponding recesses formed in the corresponding slides at the other side. The directly opposite slides comprising each pair carry one of the blade frames by means of the recesses 18 and overhanging lugs 19 formed at the upper portions of the blade frame which engage with the upper ends of the slides 12 and are rigidly attached thereto by suitable screws 20. The side pieces 4 of the side frames are formed with outwardly extending raised portions 21, the faces of which are machined to have a snug fitting sliding engagement with the recesses 18 of the slides 12, as shown in Figs. 2 and 4.

It is to be noted in this connection that when the blade frames are assembled in the slides, they are disposed between the vertical planes of the cross members 9 which extend between the upstanding portions 7.

The cross members 9 are each formed with two or more lugs 22 which extend upwardly beyond the horizontal plane of the upper faces of the upstanding portions, and to the lugs 22 of the one cross member 9 a cover member 23 is hinged, as shown in Figs. 1, 2 and 10. This cover member is upwardly dished and formed with a continuous marginal flange 24 which seats on the upper horizontal faces of the cross members 9 and upstanding portions 7. The opposite lugs 22 are provided with eye screws 25 hinged thereto and arranged to be disposed between spaced lugs 26 formed on the cover member, there being suitable nuts 27 threaded on the screws 25 which, when tightened, bear against the lugs 26 and clamp the cover member in position. The cover member 23 forms an enclosure together with the cross members 9 to conceal the upper ends of the blade frames so that during their operation accidents from entanglement therewith by the operator will be prevented.

Frequently it is desired to remove each blade frame as a unit so that the slicing blades may be sharpened and in some cases it is desirable to replace the frame removed by a frame which carries slicing blades that are spaced farther apart or closer together. In slicing machines heretofore known this was practically impossible because of the manner in which the blade frames are mounted in the machine and because of the length of time required to make the change to a different blade frame. In the construction just described, it is only necessary, when it is desired to remove the blade frame, to tilt back the cover member 23 and then loosen and remove the screws 20. Each blade frame can then be bodily lifted out from between the cross members 9. Fig. 5 illustrates the manner in which one of the blade frames is being removed from its slides 12.

One of the advantageous features of such a construction is that all adjustments such as bearings, etc. remain unchanged during the change from one blade frame to another, and consequently no attention has to be paid to such adjustments.

The blade frames attached to the slides in the manner previously described are alternately reciprocated in opposite directions by means of a suitable rocker arm arrangement which includes a horizontal shaft 28 carried by suitable bearings 29 secured to the side frames 6, the axis of the shaft being disposed substantially coincident with a vertical plane lying midway between the blade frames. The shaft 28 carries a rocker arm 30 at each end outwardly of the side frames 6 which is provided with pivot pins 31 arranged substantially 180 degrees apart, as shown in Figs. 1 and 2. These pivot pins are connected with the lower ends of vertically extended connecting rods 32, the one connecting rod at one side of the slicer being journaled on the pivot portion 16 of the slide 12 disposed at that side of the vertical plane referred to and the other connecting rod at the same side of the slicer being journaled on the pivot portion 16 of its adjacent slide. Each blade frame is therefore driven by two connecting rods arranged at opposite ends to prevent undue stressing thereof.

The shaft 28 is oscillated by means of a crank arm 33 rigidly secured thereto and which is connected by means of a pitman rod 34 to the crank 35 of a suitable crank shaft 36, as shown in Fig. 1. The crank shaft is provided with a suitable flywheel 37 to impart momentum to the slicing apparatus and is driven in any suitable manner, such as by an electric motor (not shown).

The portions of the side frame and upstanding portions 7 are inwardly resisted in the region of the connecting rods 32 and rocker arms 30 to provide substantial housings therefor. Cover plates 38 are rigidly secured to the side frames at the bounding edges of the bearings to completely enclose the rocker arms 30 and connecting rods 32. This provides a chamber for these parts which may be partly filled with a lubricant and which permits the pivot connections between the connecting rods and rocker arms to operate directly in a lubricant. In order to lubricate the slides 12 lubricant is pumped from a reservoir 60 by means of a power driven pump 61 through feed lines 62, into cup-like members 39 formed on the side frames 6 immediately above the pivot portions 16 so that the lubricant may drip through suitable perforations in the bottoms of the cup-like members 39 directly onto the pivotal connections of the reciprocating rods 32 with the pivot portions 16. Lubricant may also be fed through suitable conduits 63 to the guide bearing surfaces between the slides and side frame members. In order to catch the lubricant that may seep downwardly between the slides and the guideways therefor, suitable deflecting members 40 are secured to the inner faces of the side frames 6 directly below the slides 12, as shown in Fig. 2, to catch the lubricant and direct the same through openings 41 into the lubricant holding chamber which surrounds the connecting rods 32. Excess lubricant feeds through a conduit 64 from the lubricant chamber directly into the reservoir 60.

In the construction shown, the bread or other article to be sliced is fed to the slicing mechanism by an endless feed conveyor 42 and discharged onto a feed or transfer plate 43 which supports the article as it is being sliced and discharges the same after slicing onto an endless discharge conveyor 44. The feed and discharge conveyors, however, do not form a part of the present invention and will not be described in detail.

As shown in Figs. 7, 8 and 9, the transfer plate 43 is arranged at an angle to the horizontal so that the article may be sliced corner first, although in certain cases it may be horizontally arranged. The transfer plate is of a single piece of metal having a plurality of spaced finger portions 45 which extend rearwardly and upwardly between the slicing blades 1 to serve as means for preventing substantial vibration of the slicing blades 1. The plate 43, furthermore, is secured to and flush with a transverse member 46 which extends between the upstanding portions of the side frames and which is removable therefrom. An attaching bracket 47 is secured to each end of the member 46 to extend in a vertical direction when the plate 43 is in slicing position. Each bracket is provided, as shown in Figs. 7 and 8, with two open sided recesses 48 and 49, the recess 48 presenting downwardly and the recess at the upper end presenting horizontally in a rearward direction. The transfer plate assembly described is supported by lower and upper pins 50 and 51, respectively, which are carried by plates 52 secured to the inner faces of the side frames. The plate assembly is placed in approximate position with the lower pins 50 disposed in the downwardly presenting recesses 48 of the brackets 47 as shown in solid outline in Fig. 9, and is then pivoted rearwardly until the brackets 47 assume a vertical position, in which position the upper pins 51 are received by the upper horizontal recesses 49 of the brackets. The brackets are then clamped to the upper pins 51 by means of suitable cap screws threaded therethrough, which are arranged to be threaded into the upper pins 51.

When it is desired to remove the slicing blades for sharpening purposes, the cap screws 53 are threaded outwardly for dis-engagement from the pins 51 and the transfer plate assembly is then swung forwardly or completely removed out of the way of the blade frames which are to be removed.

In removing each blade frame as a unit, the cover member 23 is tilted on its hinges, which gives access to the blade frames, as indicated in broken outline in Fig. 1. Then the cap screws 20, which are the sole means of securing the blade frames to the slides, are removed. The blade frames are then grasped and moved upwardly between the upper cross members 9 in a very simple and easy operation.

In case blade frames having a different spacing between the slicing blades are re-inserted in the slicing machine, a different transfer plate having a corresponding spacing between the finger portions is employed.

It is to be particularly noted in the slicing machine described, that all of the moving parts, with the exception of the slicing blades, are completely enclosed so that accidents from engagement with moving parts of the machine will be prevented.

It is also to be noted that the operating mechanism for the blade frames is completely enclosed and operative in a body of lubricant, so that little attention need be paid to the lubrication of the machine, it only being necessary to see that the chamber or reservoir 60 is filled to a suitable level with lubricant.

Another advantageous feature to be noted is that the blade frames can be very easily and quickly removed for sharpening purposes and for replacement by blade frames having a different spacing between the slicing blades.

In Figures 11 to 13 inclusive there is shown a modified type of blade frame mounting in which each blade frame X, there being only one shown in Fig. 11, is of substantially the same type as previously described. The supporting means for the blade frame comprises a pair of tubular members 70 that have bearings 71 at their opposite ends and which are mounted for reciprocating movement on fixed vertically extending guide rods 72. The tubular members 70 are connected at their upper ends by a horizontal cross rod 73 which is formed with shoulders to assist in holding the tubular members against rotational movement, and which abut against offset lugs 74.

The bottom portions of the tubular members 70 are formed with aligned ledges 75 and spaced guides 76 at the sides of the ledges 75. The blade frame X is mounted with the lower head piece positioned between the guides 76 and seated on the ledges 75, which properly align the blade frame with the tubular members 70. It is to be noted in Fig. 12 that the rod 73 is offset with respect to the axes of the tubular members 70 to permit a vertical, unhindered movement of the blade frame.

The blade frame is formed with a pair of overhanging lugs 77 which are arranged to seat on machined clamps 78 that are rigidly secured to the cross rod 73. The blade frame is secured to these clamps by suitable cap screws 79 which provide the sole securing means. When it is desired to remove the blade frame for sharpening the cutter blades, or replacing with differently spaced blades, it is only necessary to remove the cap screws 79, thus obviating the necessity of changing bearing settings and the like.

In the constructions shown in Figs. 14 and 15, side guides or slides 80, such as those previously described in connection with Figs. 1 to 10, are employed. The sides of each slide 80 are formed with longitudinal channels 81, which are arranged to receive the outer races of regularly spaced anti-friction bearings 82. The inner races of the bearings 82 are shown as mounted on eccentric adjusting pins 83, which are secured to the side frame members, and since the two blade frames Y and Z simultaneously reciprocate in opposite directions, it is only necessary to employ three rows of bearings, the outer races of the intermediate row being disposed for engagement with the inner channels 81 of the slides 80. By rotating the pins 83, suitable bearing adjustment can be easily obtained.

It is obvious in the constructions shown in the drawings that the blade frames are interchangeable and can be easily and quickly removed for sharpening the blades thereof or for replacing the blades without delaying the operation of the machine for any great length of time. By making the blade frames removable in the manner described, the blades can be much more easily replaced with the blade frames removed than when the frames are not removed.

When it is desired to slice bread to provide slices of a different thickness the same machine can be used, it being necessary to only remove the blade frames and replace them with blade frames in which the blades are differently spaced. This, as before stated, can be very quickly and conveniently accomplished since the means for disconnecting the blade frames is conveniently located where it is readily accessible.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a slicing machine, a pair of spaced side frames, a pair of vertically reciprocable blade frames mounted to reciprocate between said side frames, a plurality of slicing blades carried by each of said blade frames, and transfer means for supporting the article being sliced comprising a plate having finger portions extending between said slicing blades, brackets secured to the ends of said plate each having at one end a longitudinal open ended recess and at its opposite end a horizontally arranged open ended recess, and means for supporting said transfer plate on said frames, including a pair of pins extending horizontally inwardly from each side frame and arranged in a vertical plane, one of said pins being receivable by the longitudinal slot of said bracket and the other of said pins being receivable by the horizontal slot of said bracket.

2. In a slicing machine, a pair of spaced side frames, a pair of vertically reciprocable blade frames mounted to reciprocate between said side frames, a plurality of slicing blades carried by each of said blade frames, and transfer means for supporting the article being sliced comprising a plate having finger portions extending between said slicing blades, brackets secured to the ends of said plate each having at one end a longitudinal open ended recess and at its opposite end a horizontally arranged open ended recess, and means for supporting said transfer plate on said frames, including a pair of pins extending horizontally inwardly from each side frame and arranged in a vertical plane, one of said pins being receivable by the longitudinal slot of said bracket and the other of said pins being receivable by the horizontal slot of said bracket, and screw means carried by said brackets in the horizontal plane of said horizontal recesses, said screw means being engageable with the adjacent pin to lock said bracket and transfer plate against movement relative to said side frames.

3. In a slicing machine a pair of side frames, cross members extending between said side frames, spaced guideways on the inner faces of the side frames, grooved blade frame holding slides independently mounted between said spaced guideways, means disposed outwardly from said grooved slides and guideways and secured to the outer walls of said grooved slides for synchronously reciprocating said slides between said guideways, said slides having extremities adapted to be engaged by overhanging lugs of a blade frame, a blade frame removably mounted between the slides, said blade frame having overhanging lugs seating on the extremities of the slides at an angle to the direction of reciprocation of the slides, whereby the weight of the blade frame is carried directly by the slides, means to secure the blade frame lugs to the extremities of the slides, and means for holding the portions of said blade frame remote from the overhanging lugs against movement transversely of said slides, said means including longitudinal grooves in the inner faces of said slides and cooperating portions at the said remote portions of said blade frame seating in bearing engagement with the walls of said grooves.

HENRY H. YERK.